Patented Dec. 11, 1934

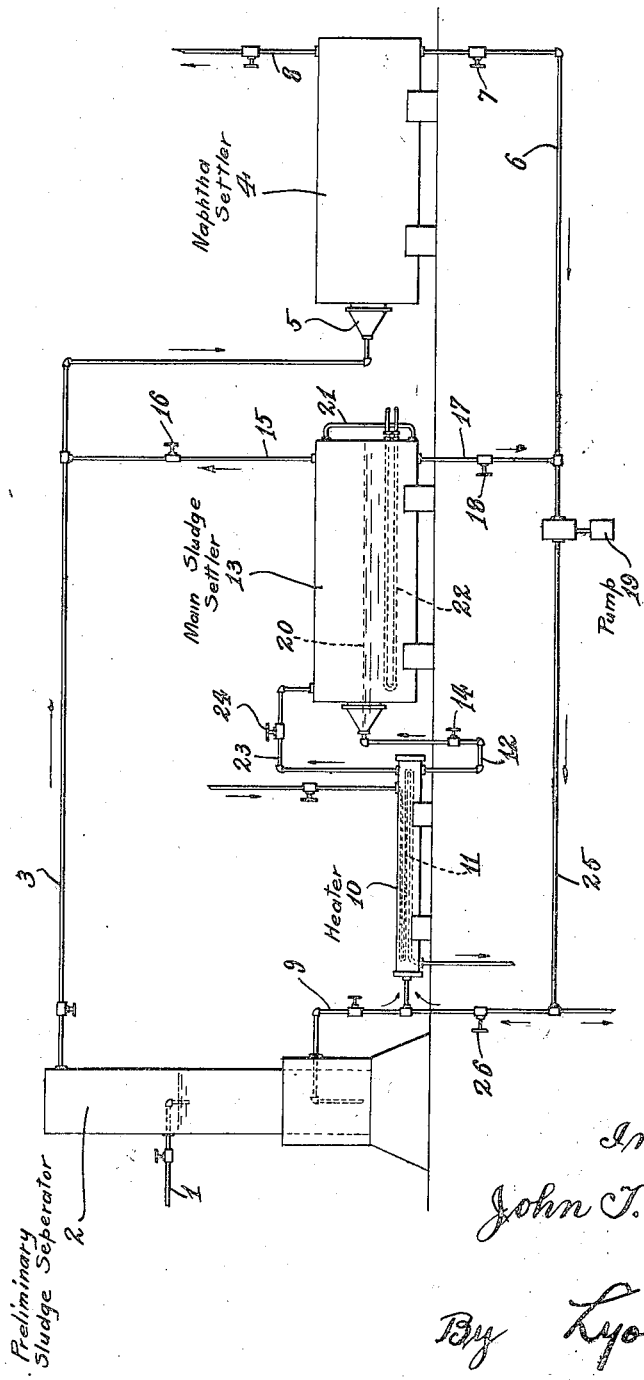

1,983,678

UNITED STATES PATENT OFFICE 1,983,678

METHOD OF AND APPARATUS FOR TREATMENT OF OIL SLUDGE

John T. Rutherford, Berkeley, Calif., assignor to Standard Oil Company of California, San Francisco, Calif., a corporation of Delaware Application November 17, 1930, Serial No. 496,161

13 Claims. (Cl. 196—148)

This invention relates to a process and apparatus for the recovery of oil from sludges produced by the action of sulfonating agents on petroleum oils. The process is particularly adapted for the recovery of petroleum oils which have been treated with a sulfonating agent, such as sulfuric acid, at low temperatures, that is, temperatures below the maximum reaction temperature of the acid and oil.

In the conventional treatment of petroleum oils with sulfuric acid, the acid reacts with the oil and the impurities in an exothermic reaction in the rise to high temperatures, sometimes as high as 140° F. The sludge formed by the action of the acid on the oil settles to the bottom of the treating vessel and is drawn off and passed to storage or to a separating plant for the recovery of the entrained oil, acid and tar.

The usual method of treating sludges for the recovery of valuable constituents therefrom, is to hydrolyze the sludge with steam or water at high temperature, with or without the use of pressures above atmospheric. In the present process the sludge is treated at temperatures below 80° F. to 125° F. in the absence of added water and/or added distillate or oil.

It is well known that at the high temperatures developed in the oil during the conventional treatment with a sulfonating agent such as sulfuric acid, the reaction between the acid and the oil is violent and a relatively large amount of valuable oil is decomposed or polymerized by the acid. Valuable components, such as the unsulfonated hydrocarbons, are thus polymerized and lost. Attempts have been made to prevent excessive loss of oil during acid treatment by controlling the reaction temperature and limiting it to a temperature at which the affinity of the acid for the sulfur compounds and other impurities in the oil, is not diminished while the action of the acid on the valuable non-sulfur bearing oil is greatly diminished. One such process of treating oils while controlling the reaction temperature between the acid and the oil, is disclosed in United States Letters Patent No. 1,705,809 granted March 19, 1929, to William N. Davis, et al.

Although the acid sludge resulting from a low temperature treating process, such as described in the aforesaid Letters Patent, may be processed for the recovery of entrained oil, free acid and tar, in the usual manner, that is, by passing the sludge first to settling pans where the entrained oil rises to the top and is skimmed off and then passing the removed sludge through a hydrolyzing process for the recovery of weak acid and tar, still such conventional methods of processing the sludge are unsatisfactory as the entrained oil is rendered unfit for use and the acid recovered is only a small proportion of the acid in the sludge and furthermore, such recovered acid is of a very unsatisfactory character.

It has been found that the cold sludge (from processes in which the reaction temperature between the oil and acid is maintained at a low temperature) becomes warm very rapidly and the acid in the sludge attacks the entrained oil with increasing speed during the processing of the sludge, until most of the oil has been polymerized, sulfonated or otherwise rendered unfit for use. For example, a sludge initially at a temperature of about 20° F. contains about 40% of entrained oil. If this sludge is allowed to stand in settling pans in the usual manner, no substantial separation between the oil and sludge occurs during the first day or two, but a reaction sets in eventually and the sludge rises in temperature steadily with an accompanying reaction between the oil and acid in the sludge. As the reaction and increase in temperature progresses, sulfur dioxide gas evolves and vigorous ebullition sets in when the temperature of the sludge rises to approximately between 100° F. and 140° F. The temperature at which the ebullition and evolution of sulfur dioxide becomes quite noticeable varies with the nature of the sludge and acid.

It has been also found that at temperatures above about 80° F. the oil and sludge begin to separate but the ebullition described hereinabove prevents settling and separation of the oil and sludge. Furthermore, the rise in temperatures causes polymerization and sulfonation of the oil. It has also been found that the sulfur compounds produced at these high temperatures are exceptionally stable and difficult to break down. In this manner, the major portion of the oil is thus polymerized, sulfonated and otherwise rendered unfit for use, whereas the quantity of sulfuric acid available for recovery is simultaneously reduced by reason of its absorption during the reaction of the oil and loss of sulfur dioxide.

It is an object of this invention to disclose and provide a method of treating sludges resulting from the action of sulfonating agents on petroleum oils whereby entrained oil may be separated from the sludge with great efficiency and in a desirable condition.

Another object is to disclose and provide a method of separating entrained oil from acid sludge in a rapid and effective manner whereby ebullition is prevented and appreciable polymerization of entrained oil retarded.

An object of this invention is to disclose and provide a process of treating sludges resulting from the action of sulfonating agents on petroleum oils wherein the temperature of the sludge settling process is controlled and limited to a temperature at or above that at which rapid separation occurs and below the maximum reaction temperature of the oil and acid or below the temperature at which ebullition sets in.

A still further object of this invention is to disclose and provide a method of treating sludges resulting from the action of sulfonating agents on petroleum oils at low temperatures wherein temperature conditions are controlled in a particular manner in a range below the maximum reaction temperature of the sulfonating agent and oil whereby loss of acid by volatilization and dissociation and loss of appreciable amounts of oil by polymerization, is prevented.

A still further object of this invention is to disclose and provide an apparatus by means of which acid oil sludges may be readily treated for the separation of oil and acid therefrom.

These and other advantages of this invention will become apparent to those skilled in the art from the following detailed description in which reference will be had to the appended drawing.

The drawing appended hereto is a diagrammatic side elevation of one arrangement of elements by means of which the invention may be placed into operation.

In general, the process comprises heating the cold acid sludge to a temperature at which rapid separation between the oil and sludge takes place but below the maximum reaction temperature of oil and acid in said sludge, and then settling said sludge and abstracting heat therefrom to maintain the temperature of said sludge below a temperature at which ebullition and an appreciable amount of polymerization of oil by acid in said sludge takes place.

As shown in the drawing, the sludge from an acid treating process in which the temperature during treatment is maintained below the maximum reaction temperature of the oil and acid (as, for example, described in Patent No. 1,705,809) is first sent as by means of a valve line 1 into a preliminary sludge separator 2 which may consist of a tall tank. The temperature of the sludge in the separator 2 is below 38° F. and preferably at about or below 20° F. when the process of Patent No. 1,705,809 is employed in the treatment of the oil. A certain amount of oil will separate from the sludge, such oil or naphtha rising to the top in the preliminary separator 2 from whence it may be withdrawn as by means of a line 3.

The oil or naphtha discharged by the line 3 may contain some sludge in suspension. The line 3 may lead to a settler 4 provided with a suitable inlet 5 adapted to insure quiet flow into the settler 4. In the settler 4 the sludge separates from the oil and may be discharged therefrom as by means of a line 6 provided with a valve 7. The purified and substantially sludge-free oil or naphtha may be discharged from the upper portion of the naphtha settler 4 as by means of a valve line 8 leading to storage tanks, washers or other suitable means in which the oil or naphtha may be further purified.

If desired, the naphtha may be returned to the acid treating plant or to the stills for redistillation.

The major portion of the sludge and entrained oil passes from the bottom of the preliminary sludge separator 2 by means of a valve line 9 into a heater 10 provided with suitable means for heating the sludge and oil, such as, for example, the steam coils 11. In the heater 10 the sludge is preferably quickly heated to a temperature at which rapid separation between the oil and sludge may take place. It has been found, for example, that temperatures of between 80° F. and 100° F. are the preferred temperatures, depending upon the nature and character of the oil and sludge. Since the reaction between the sludge acid and entrained oil proceeds at all temperatures but requires an appreciable time factor for completion, it is advantageous to raise the temperature relatively quickly to the separating temperature and to separate the naphtha and sludge before the reaction has had time to progress appreciably.

The warmed sludge may then be discharged as by means of the line 12 from the heater 10 into the main sludge settler 13. A valve 14 may be positioned in the line 12. The main sludge settler 13 is preferably provided with a line 15 provided with a valve 16, said line 15 connecting the upper portion of the main sludge settler 13 with the oil line 3.

The lower portion of the main sludge settler 13 may be provided with a line 17 having a valve 18 therein, said line 17 leading to a suitable pump 19 by means of which the sludge from the main sludge settler 13 may be conveyed to the acid recovery plant or other point of disposal. The point of separation indicated by the line 20 between the oil and sludge in the main sludge settler 13 may be visually observed by means of an indicator 21. The main sludge settler 13 may be provided with a cooling coil or coils 22 by means of which heat may be abstracted from the sludge so as to maintain the temperature of the sludge and oil in the settler 13 at below the maximum reaction temperature of the oil and acid and below the temperature at which ebullition and an appreciable amount of polymerization of oil by the acid takes place.

A line 23 provided with a valve 24 may connect the upper portion of the heater 10 with the upper portion of the main sludge settler 13 so that any gas formed in the heater 10 can be passed to the top of the sludge settler. If desired, a portion of the sludge removed from the main sludge settler 13 by means of the line 17 may be returned by the sludge pump 19 and line 25 to the heater 10. A valve 26 may be positioned in the line 25. Similarly, the sludge removed from the naphtha in the settler 4 may be returned by line 6 and line 25 to the heater or the sludge from the settler 4 may be sent to the recovery plant.

In operation the sludge, containing the entrained oil, from the low temperature treating plant, is passed while still at a low temperature of approximately 20° F. through the preliminary separator 2 and then to the heater 10 where the temperature of the sludge is raised to a temperature at which settling takes place, say to about 85° F. At this temperature, the reaction between the acid and the oil starts to take place, the heat of reaction causing the temperature of the mixture to continue to rise so that the oil and sludge in the main sludge settler 13 is generally at a temperature of about 100° F. In some instances the temperature in the main sludge settler would go higher than 100° F. and if not controlled would reach the maximum reaction temperature and the advantages of the process would be lost. To overcome this disadvantage, means have been provided for keeping the temperature in the main sludge settler 13 at below the maximum reaction temperature at which ebullition occurs. For example, the cooling coil 22 has been provided for this purpose although the temperature control may be accomplished in several ways by varying the volume of sludge in the settler 13. Radiation losses are themselves sufficient to keep the temperature below about 120° F.

The separation temperature and the rate of separation will vary with the type of sludge being processed. It has been found that the treatment of 200 barrels per hour of cracked motor naphtha with 0.3 pound of 98% sulfuric acid per gallon of naphtha, produces approximately 7.5 barrels of sludge per hour.

The sludge entering the heater 10 contained about 30% of entrained oil whereas the sludge leaving the main sludge settler 13 through the line 17 contained only about 3% of entrained oil. The separating temperature in the example given was about 95° F. The oil or naphtha separated from the sludge and discharged through the lines 15, 3 and 8, had an average gravity of about 38° A. P. I.

It is advantageous to maintain a slight pressure on the main sludge settler 13 and this can be done by means of the valves 14, 16 and 18. In some instances, the back pressure on the system will maintain sufficient pressure on the settler. Furthermore, in some cases the heater 10 may be omitted, the temperature control being then devoted entirely to keeping the reaction temperature from reaching its normal maximum. When omitting the heater, it is advantageous to increase the amount of sludge held in the main sludge settler 13 and to allow a longer settling time. The heat of reaction alone is sufficient to obtain the desired settling temperature by this method with some sludges although a greater time interval may be required, thus cutting down the capacity of the plant. Excess heating can, of course, be prevented by means of cooling coils.

It will be seen that this invention is not limited to any particular apparatus or to the exact sequence of operations described herein but includes all apparatus and processes by which an acid sludge from a low temperature treating process is settled under controlled conditions of temperature so that the settling temperature is held below the maximum reaction temperature.

A preferred embodiment of the invention includes the step of raising the temperature of the cold sludge relatively rapidly to the separation temperature whereby the loss of naphtha is reduced and a less refractory form of residual sludge obtained.

It will be obvious to those skilled in the art that numerous changes and modifications may be made without departing from this invention. All such changes and modifications as come within the scope of the appended claims are embraced thereby.

I claim:

1. In a process of separating entrained oil from acid sludge produced by the treatment of mineral oil with sulfuric acid at temperatures below the maximum reaction temperature of the acid and oil, the steps of quickly heating the sludge to a temperature at which rapid separation between the oil and sludge takes place but below the maximum reaction temperature of oil and acid in said sludge, and then abstracting heat from the sludge while settling said sludge to maintain the temperature of said sludge below a temperature at which ebullition and an appreciable amount of polymerization of oil by acid in said sludge takes place, and separating the oil from the settled sludge.

2. In a process of separating entrained naphtha from acid sludge produced by the treatment of petroleum naphtha with sulfuric acid at temperatures below the maximum reaction temperature of the acid and naphtha, the steps of settling the sludge at a temperature of about 20° F. and separating a part of the naphtha from the major portion of the sludge, quickly heating the remaining major portion of the sludge to a temperature above about 80° F. but below the maximum reaction temperature of oil and acid in said sludge, whereby loss of acid by volatilization and loss of appreciable amounts of acid by polymerization is prevented, and separating the naphtha from the settled sludge.

3. In a process of separating entrained naphtha from acid sludge produced by the treatment of petroleum naphtha with sulfuric acid at temperatures below the maximum reaction temperature of the acid and naphtha, the steps of settling the sludge at a temperature of about 20° F. and separating a part of the naphtha from the major portion of the sludge, quickly heating the remaining sludge to a temperature above about 80° F. but below the maximum reaction temperature of naphtha and acid in said sludge, and then settling said sludge and abstracting heat therefrom to maintain the temperature of said sludge below a temperature at which ebullition and an appreciable amount of polymerization of naphtha by said sludge takes place, and separating the naphtha from the settled sludge.

4. In a process of separating entrained naphtha from acid sludge produced by the treatment of petroleum naphtha with sulfuric acid at temperatures below the maximum reaction temperature of the acid and naphtha, the steps of settling the sludge at a temperature of about 20° F. and separating a part of the naphtha from the major portion of the sludge, quickly heating said residual sludge to a temperature of between about 80° F. and 125° F. whereby ebullition caused by evolution of sulfur dioxide is prevented and polymerization of entrained oil retarded while separation of naphtha and sludge is facilitated, abstracting a part of the heat of reaction from said sludge to maintain the temperature of said sludge below about 125° F., and separating the naphtha from the sludge.

5. In a process of separating entrained oil from sludge produced by the treatment of mineral oils with a sulfonating agent at temperatures below the maximum reaction temperature of the sulfonating agent and oil, the steps of settling the sludge at a temperature of about 20° F. and separating a part of the oil from the major portion of the sludge, quickly heating the remaining major portion of the sludge to a temperature above about 80° F. but below the maximum reaction temperature of the oil and sulfonating agent in said sludge, whereby an appreciable amount of polymerization of oil by sulfonating agent in said sludge is prevented, and separating the oil from the settled sludge.

6. In a process of recovering oil from acid sludge resulting from the treatment of mineral oil with a sulfonating agent at temperatures below the maximum reaction temperature of the sulfonating agent and oil, the steps of maintaining the sludge resulting from such treatment at a temperature below the maximum reaction temperature from the time of its formation, quickly heating the sludge to a temperature of between 80° F. and 125° F. but below the maximum reaction temperature of the sulfonating agent and oil, and then subjecting the warmed sludge to a settling operation while maintaining said sludge at a temperature below the maximum reaction temperature of the sulfonating agent and oil during such settling, and separating oil from the settled sludge.

7. In a process of recovering oil from acid sludge produced by the treatment of mineral oil with a sulfonating agent at temperatures below the maximum reaction temperature of the sulfonating agent and oil, the steps of maintaining the sludge resulting from such treatment at a temperature below the maximum reaction temperature from the time of its formation, preliminarily separating oil from the sludge by settling while maintaining said low temperature, quickly heating the residual sludge and oil to a temperature of between 80° F. and 125°F. but below the maximum reaction temperature of the sulfonating agent and oil, subjecting the warmed sludge to a settling operation while maintaining it at below the maximum reaction temperature of sulfonating agent and oil, separating oil from said sludge, commingling said separated oil with oil separated during the preliminary settling operation, and further settling said commingled oils to separate sludge therefrom.

8. In a process of separating entrained oil from acid sludge resulting from the treatment of mineral oil with a sulfonating agent at temperatures below the maximum reaction temperature of the sulfonating agent and oil, the steps of facilitating the removal of exothermic heat of reaction from the sludge so as to maintain the temperature thereof between 80° F. and 120° F., but above the actual treatment temperature, settling the sludge while maintaining the same at said temperature whereby ebullition due to evolution of sulfur dioxide is prevented and polymerization of oil entrained in the sludge is retarded, and separating the oil from the settled sludge.

9. In a process of separating entrained oil from acid sludge resulting from the treatment of mineral oil with a sulfonating agent at temperatures below the maximum reaction temperature of the sulfonating agent and oil, the steps of settling the sludge and separating a part of the oil from the major part of the sludge, maintaining the sludge resulting from such treatment at a temperature below the maximum reaction temperature of the sulfonating agent and oil but above the actual treatment temperature, removing a part of the exothermic heat of reaction from the sludge so as to maintain the temperature thereof between 80° F. and 125° F. and below the maximum reaction temperature of the sulfonating agent and oil, settling the sludge while maintaining the same at said temperature, whereby ebullition due to evolution of sulfur dioxide is prevented and polymerization of oil entrained in the sludge is retarded; and separating the oil from the settled sludge.

10. In a process of separating entrained oil from acid sludge resulting from the treatment of mineral oil with a sulfonating agent at temperatures below the maximum reaction temperature of the sulfonating agent and oil, the steps of: maintaining the sludge resulting from such treatment at a temperature below the maximum reaction temperature of the sulfonating agent and oil but above the actual treatment temperature, removing a part of the exothermic heat of reaction from the sludge so as to maintain the temperature thereof between 80° F. and 125° F. and below the maximum reaction temperature of the sulfonating agent and oil; settling the sludge while maintaining the same at said temperature, whereby ebullition due to evolution of sulfur dioxide is prevented and polymerization of oil entrained in the sludge is retarded; and separating the oil from the settled sludge.

11. In an apparatus for processing acid sludge the combination of a vertical preliminary sludge separator, conduit means communicating with the upper portion of said vertical separator for withdrawing separated oil, a heater, conduit means connecting the lower portion of said vertical separator with said heater, a settling tank, pipe means for conveying sludge from said heater to said tank, an oil outlet connected to the top of said tank, a sludge outlet communicating with the lower portion of said tank, a cooling coil positioned in the lower portion of said tank, and means for supplying cooling fluid to said coil.

12. In a process of separating entrained naphtha from acid sludge produced by treatment of petroleum naphtha with sulphuric acid at temperatures below the maximum reaction temperature of the acid and naphtha, the steps of settling the sludge at a temperature of about 20° F. and separating a part of the naphtha from the major portion of the sludge, effecting a further separation of naphtha from the sludge at a temperature of between about 80° F. and 125° F. whereby ebullition caused by evolution of sulphur dioxide is prevented and polymerization of entrained oil retarded while separation of naphtha and sludge is facilitated, abstracting a part of the heat of reaction from said sludge to maintain the temperature of said sludge below about 125° F., and separating the naphtha from the sludge.

13. In a process of separating entrained naphtha from acid sludge produced by treatment of petroleum with sulphuric acid at temperatures below the maximum reaction temperature of the acid and naphtha, the steps of settling the sludge and separating a part of the naphtha from the major portion of the sludge at a temperature approximating the treatment temperature, then effecting a further separation of entrained naphtha from the sludge at a temperature which exceeds the treatment temperature, and is within the range of 80° F. to 125° F. while abstracting a part of the heat of reaction from said sludge to maintain the temperature below about 125° F., whereby ebullition caused by evolution of sulphur dioxide is prevented and polymerization of entrained oil is retarded while separation of naphtha and sludge is facilitated.

JOHN T. RUTHERFORD.